C. I. LINDAU.
WEIGHING APPARATUS FOR LIQUIDS.
APPLICATION FILED MAR. 14, 1921.
1,412,410.
Patented Apr. 11, 1922.
2 SHEETS—SHEET 1.
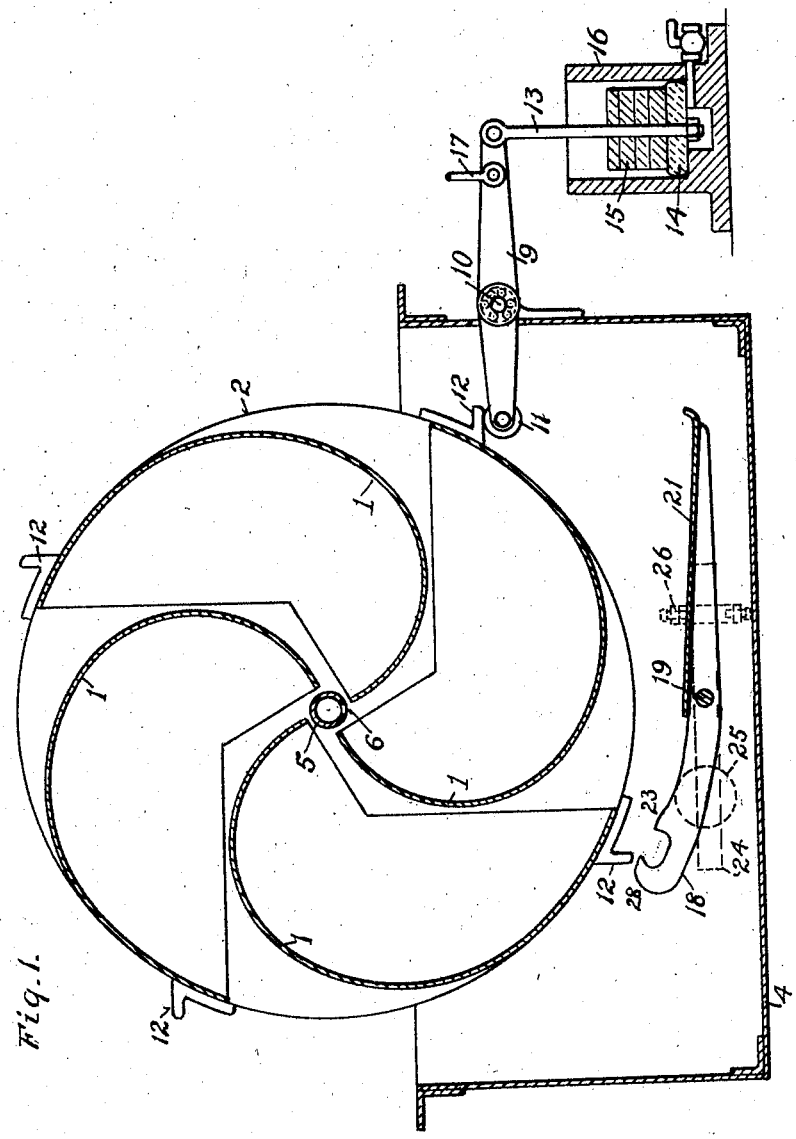
INVENTOR.
Charles I. Lindau
BY Arthur P. Knight
ATTORNEY.

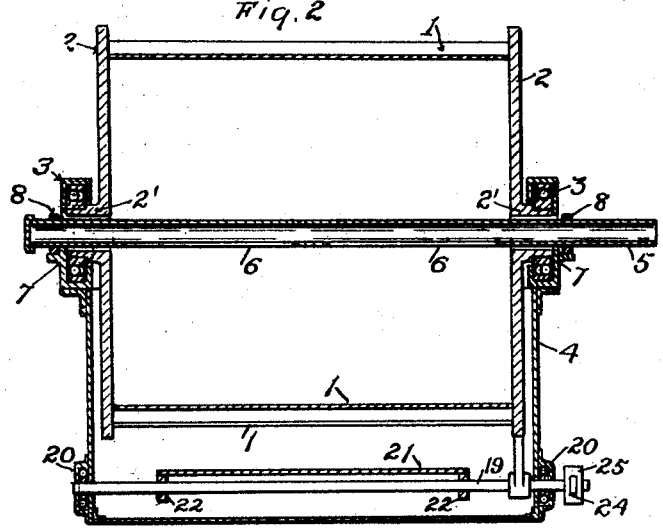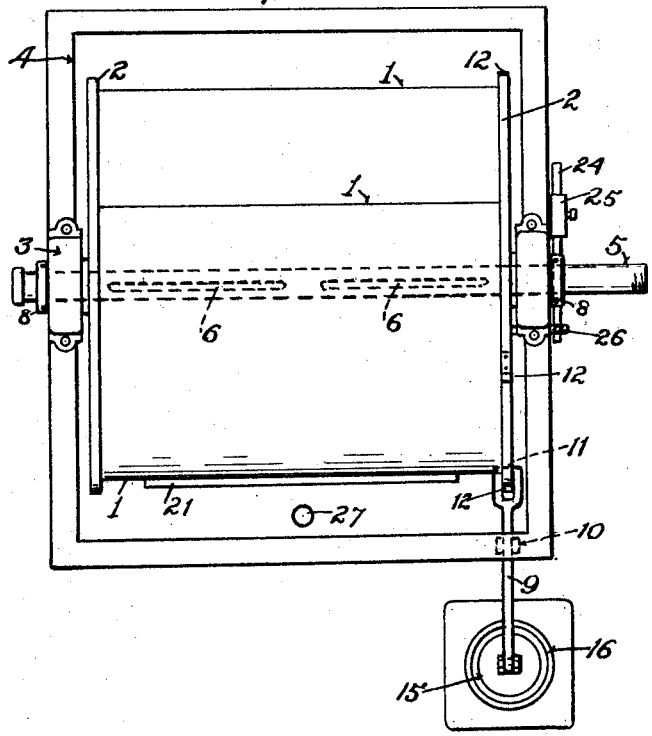

UNITED STATES PATENT OFFICE.

CHARLES I. LINDAU, OF HURLEY, NEW MEXICO.

WEIGHING APPARATUS FOR LIQUIDS.

1,412,410. Specification of Letters Patent. Patented Apr. 11, 1922.

Application filed March 14, 1921. Serial No. 451,966.

*To all whom it may concern:*

Be it known that I, CHARLES I. LINDAU, a citizen of the United States, residing at Hurley, in the county of Grant and State of New Mexico, have invented a new and useful Weighing Apparatus for Liquids, of which the following is a specification.

This invention relates to means for automatically weighing water, or other liquid, passing in or from a pipe or conduit, for example, in a condenser line, and the main object of the invention is to provide simple and effective means for this purpose.

The accompanying drawings illustrate an embodiment of my invention, and referring thereto:

Fig. 1 is a transverse vertical section of the weighing apparatus;

Fig. 2 is a longitudinal section; and

Fig. 3 is a plan view thereof.

The apparatus as shown in the drawings comprises buckets or containers 1 mounted on or secured to a rotary member 2, provided with trunnions 2' whereby it is journalled on ball or roller bearings 3 supported on a receiving tank 4. A supply pipe 5 with port or ports 6 formed as slots passes through the trunnions on said rotary member and is supported on brackets 7 and held in a stationary position by clamps 8. A weighing lever 9 is mounted on a ball or roller bearing pivot 10 and provided with a stop roller 11 adapted to engage anyone of several projections or lugs 12 on the rotary member 2, said lugs corresponding in number and position to the respective buckets or containers 1 and being so arranged that as the liquid flows from supply pipe 5 and through port 6 into the bucket under said port, the weight of the liquid in the bucket corresponding to each lug will cause a downward pressure on roller 11 on lever 9 tending to raise a rod 13 connected to piston 14 on which is secured weights 15. Said piston fits inside of a dash pot 16, and the weights are so adjusted that when the bucket under said port 6 is filled to a predetermined weight, lever 9 will be tilted sufficiently to permit lug 12, corresponding to said bucket, to move off the stop roller 11. Lever 9 will then move back to normal position. A counter or register, not shown, may be connected, for example, by rod 17 to weighing lever 9 or rotary member 1 for registering the operation and the quantity weighed or measured.

A stop 28 on a stop lever 18 is provided for temporarily stopping the rotation of member 1 before the lug 12 corresponding to the next bucket comes to position against roller 11. Stop lever 18 is connected to shaft 19 which is supported in ball or roller bearings 20 mounted on receiving tank 4 and is adapted to engage the lug 12 after it passes roller 11, and just before the next lug 12 reaches roller 11. A pan 21 is mounted on lever arms 22 fastened to shaft 19. As the liquid is dumped or discharged from the buckets 1 it falls on pan 21 and the weight of such liquid causes pan 21 to act as a lever to raise the stop 18 into position to engage the lug 12. Lever arm 24 on shaft 19 is provided with counter weight 25 for balancing pan 21 and stop 18. A back stop 23 formed as a shoulder on stop lever 18 prevents a possible rebound of the rotary member 2. When the liquid runs off of pan 21, said pan returns to its raised position and stop 28 will disengage the lug 12. The movement of lever arm 24 is controlled by an adjustable stop 26. The liquid weighed or measured into receiving tank 4 is discharged through opening 27.

In the operation of the device, water, or other liquid, passes from pipe 5 through port 6 into the bucket 1 in position to receive and hold the liquid, the rotary member 2 being held against rotation in this operation by engagement of stop roller 11 with stop-projection or lug 12 until the weight of water in the bucket is sufficient to raise the weight 15 and tip the lever 9 so as to disengage the lug from the roller 11 and permit the rotary member 2 to rotate under the weight of the liquid so received by bucket 1. As the bucket then descends and tips, in this rotation, the liquid is discharged therefrom into box 4, a part of the liquid falling into the pan 21 and causing the same to descend so as to raise stop 28 into position to engage the lug 12 which has just left the stop means 11, and thus arrest the rotary member 2 just before the next lug 12 strikes the said stop means 11. Then, as the liquid runs off of pan 21 into the box 4, said pan rises to normal position and stop 28 is removed from said lug 12. The described partial rotation of member 2 suffices to bring the next bucket 1 into receiving position, so that liquid flows into the bucket and the weight thereof causes the rotary member 2 to turn sufficiently to bring the next lug 12 into contact with the stop means, thus completing one operation of the device, such operation being registered by the counter means connected to lever 9.

The described operation is repeated as long as liquid is supplied to the apparatus and causes registration of the weight of liquid so supplied.

It is to be understood that the form of my invention herewith shown and described is to be taken as a preferred example of the same, and that various changes in the shape, size and arrangement of parts may be resorted to without departing from the spirit of the invention or scope of the subjoined claims.

Having thus described my invention, I claim:

1. In a weighing apparatus for liquids, comprising a fixed pipe or tube, provided with a port or slot for supplying the liquid to be weighed, a rotary member mounted to rotate on said tube and provided with buckets or containers and with stop projections or lugs, said buckets being adapted to receive liquid from said port when the buckets are in arrested position and a weighing lever provided with stop means for engaging said stop projections to arrest the rotation of said rotary member under the weight of the liquid received in a bucket thereof, and to permit the stop projection to tilt the weighing lever so as to permit the stop projection on the rotary member to pass the stop means on the weighing lever when a definite amount of liquid is received by said bucket before the next stop projection reaches said stop means on the weighing lever.

2. A construction as set forth in claim 1, comprising, in addition, means for temporarily arresting the rotation of the rotary member before the next stop projection reaches the stop means on the weighing lever.

3. A construction as set forth in claim 2, in which said temporary arresting means comprises a pivoted pan for receiving liquids from the discharging bucket and provided with a stop or dog for engaging said stop projection on the rotary member and with means for gradual discharge of the liquid from said pan.

In testimony whereof I have hereunto subscribed my name this 4th day of March, 1921.

CHARLES I. LINDAU.